United States Patent [19]

Yen et al.

[11] 4,017,180
[45] Apr. 12, 1977

[54] EXPOSURE CONTROL FOR COPYING MACHINE

[75] Inventors: Nai-Chyuan Yen, Waterford, Conn.; George Marinoff, Arlington Heights, Ill.

[73] Assignee: Adddressograph Multigraph Corporation, Cleveland, Ohio

[22] Filed: Aug. 7, 1975

[21] Appl. No.: 602,581

[52] U.S. Cl. .................................. 355/68; 355/69; 355/70
[51] Int. Cl.² .................. G03B 27/74; G03B 27/78
[58] Field of Search .................. 355/67, 68, 69, 70, 355/71

[56] References Cited

UNITED STATES PATENTS

| 3,426,357 | 2/1969 | Paulus | 355/68 |
| 3,743,405 | 7/1973 | Morse et al. | 355/68 |

Primary Examiner—Russell E. Adams, Jr.
Attorney, Agent, or Firm—Russell L. Root

[57] ABSTRACT

Exposure control for an image projecting system, particularly for a projection system in which an image is projected from an illuminated object plane through a lens and onto an image plane of a copier of the full frame exposure type. Illumination means are employed for illuminating an object plane. Transducer means, preferably in the form of a photosensor, are provided in the light path and on the image side of a lens for primarily sensing the intensity of the light incident on the image plane. The transducer means produce an output signal which varies in accordance with the intensity of the projected image, and integrating means coupled to the transducer are adapted to produce a time integral output signal of the intensity of the illumination sensed by said transducer means. Means are further provided for discontinuing the illumination of the object plane by the illumination means when the time integral output signal reaches a predetermined level.

4 Claims, 4 Drawing Figures

| INPUT | INPUT | OUTPUT |
|-------|-------|--------|
| L | L | H |
| L | H | H |
| H | L | H |
| H | H | L |

FIG. 3

TERMINAL POTENTIAL

| | 71 | 72 | 73 | 74 | 75 | 76 | |
|---|----|----|----|----|----|----|---|
| ① | H | L | H | H | H | L | |
| ② | H | H | H | H | L̲ | H | SW. 34 ON |
| ③ | H | H | L̲ | L̲ | L | H | RELAY 80 ENERGIZED |
| ④ | H | H | L | L | H̲ | H | SW. 34 OFF |
| ⑤ | L̲ | H | H | H | H | L̲ | OUTPUT FROM C'PARATOR |
| ⑥ | L | L̲ | H | H | H | L | RELAY 80 OFF |
| ⑦ | H̲ | L | H | H | H | L | |

FIG. 4

EXPOSURE CONTROL FOR COPYING MACHINE

BACKGROUND OF THE INVENTION

This application relates to projection apparatus, and particularly to exposure control for an image projection system of the type generally employed in copying machines of the full frame exposure type.

In image projection systems such as copying machines where an image is projected from an illuminated object plane to an image plane the industry has been continually concerned with providing a projected image with consistency of contrast regardless of the background, color, texture or the nature of the image on an original document.

One type of known exposure control device is shown in U.S. Pat. No. 3,379,110 (Blackert et al). In this device one light source of specific wavelength is employed to illuminate an original document, and a second light source of a different wavelength which does not affect the copy material is employed for producing a controlled signal for modulating the intensity of an illumination source.

In U.S. Pat. No. 3,423,153 (Kent), a sensing device detects the light reflected from the face of the orignal document, and a control signal is employed to vary the intensity of the illumination of the light source.

In U.S. Pat. No. 3,426,357 (Paulus), a light transducer detects the intensity of light impinging upon the copy material and various logarithmic amplifier means, multiplier means, summation means and control means are employed for controlling the time of exposure of the original.

DESCRIPTION OF THE DRAWINGS

Other objects and advantages of the present invention will become further apparent from the following specifications and the accompanying drawings wherein:

FIG. 3 is a chart showing the standard truth table of a NAND gate; and FIG. 4 is a timing chart showing the states of the terminals of the NAND gates forming the flip-flop in FIG. 2 at various stages in a copying cycle.

SUMMARY OF THE PRESENT INVENTION

The present invention relates to exposure control for an image projecting system, which exposure control is believed to be capable of providing projected images of better contrast than existing forms of exposure control mechanisms. The present invention relates particularly to a projection system in which an image is projected from an illuminated object plane through a lens and onto an image plane.

According to the present invention, illumination means are employed for illuminating an object plane. Transducer means, preferably in the form of a photosensor, are provided in the light path and on the image side of a lens for primarily sensing the intensity of the light incident on the image plane. The transducer means produce an output signal which varies in accordance with the intensity of the projected image, and integrating means coupled to the transducer are adapted to produce a time integral output signal of the intensity of the illumination sensed by said transducer means. Means are further provided for discontinuing the illumination of the object plane by the illumination means when the time integral output signal reaches a predetermined level.

It is the principal object of the present invention to produce a projected image with a high consistency of contrast.

Another object of this invention is to provide an exposure control system which is effective to sense the intensity of light incident on the image plane regardless of the lens transmission characteristics.

DETAILED DESCRIPTION OF THE PREFERRED EMBODIMENT

As set forth above, the present invention relates to a projection system which has particular utility in a copying machine of the "full frame" exposure type. In a "full frame" exposure copier an original document is placed at an object plane, the object plane is illuminated and the illumination reflected from the object plane and onto a photoreceptor lying in an image plane. The description which follows relates to the present invention as employed in such a copying machine. However, from the description which follows, the manner in which the present invention may be employed in various comparable forms of projection apparatus, other than copiers, will become readily apparent to those of ordinary skill in the art.

Figure 1:
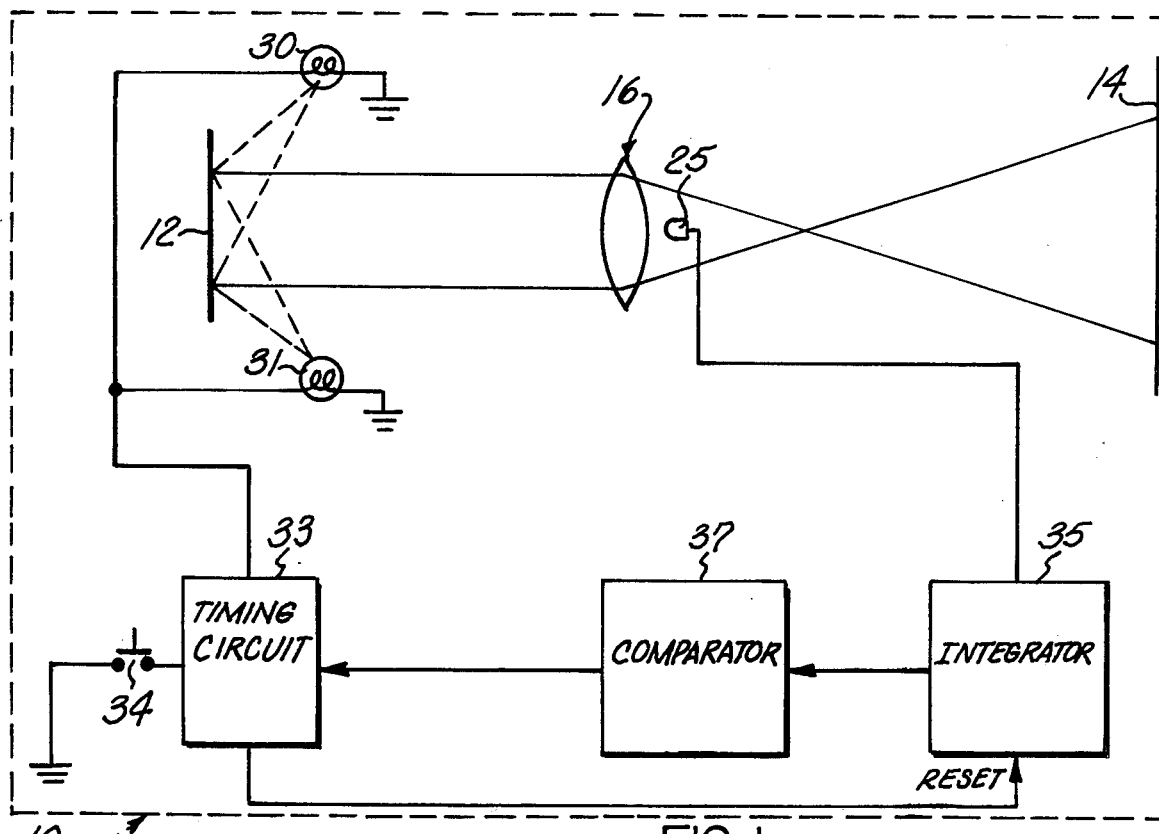
FIG. 1 is a block diagrammatic illustration of projection apparatus including the present invention.

Referring now to FIG. 1, a copying machine 10 includes an object plane 12, at which a document to be reproduced is located and an image plane 14 at which the photosensitive image receptor is positioned for receiving a projection of the document located at the object plane.

Illumination means in the form of lamps 30, 31 are provided for illuminating the object plane 12. It is preferable that the illumination means be capable of providing predeterminable fixed levels of light energy. It is recognized that, as a practical matter, the light energy levels may have some variation due to such factors as circuit loading. However, this will not interfere with proper functioning of the present invention.

A lens 16 receives the illumination reflected from the object plane and projects the reflected illumination onto the image plane 14. The path of the reflected illumination from the object plane to the image plane forms what is conventionally referred to as a light, or optic path. The portion of the light path between the object plane 12 and the lens 16 is referred to as the object side of the lens, and the portion of the light path between the lens and the image plane is referred to as the image side of the lens.

It will be recognized by those of ordinary skill in the art that the lens transmission characteristics may vary in accordance with the nature or direction of the desired projected image.

According to the present invention, transducer means are provided in the light path for sensing the intensity of the light which is incident on the image plane. In FIG. 1, the transducer means include a photosensor 25 on the image side of the lens and located in the light or optic path. The photosensor 25 may be of a conventional type for producing an output signal which varies in accordance with the intensity of light impinging thereon. Thus, with the photosensor located in this manner it is effective to accurately sense the intensity of light which is incident on the image plane regardless of the specifics of the lens transmission characteristics. In addition, the sensor will intercept light emitting from every part of the object, so that its output signal is proportional to the light from the object document or the total background provided by the object plane.

The photosensor 25 is also located preferably in close proximity to the lens. In fact, it is preferred that the photosensor be spaced from the lens by a distance which is no more than one-tenth the distance from the lens to the image plane 14. The usual sensors are rather small in size, perhaps 0.1 inches across, and hence do not seriously restrict light transmission through copier lenses of the commonly used sizes. With a photosensor of sufficiently small size in relation to the lens opening and with the photosensor positioned in close proximity to the lens opening there is no appreciable shadow effect on the image plane. At the same time, applicants have found that a photosensor located no more than one-tenth of the distance from the lens opening to the focal plane results in the photosensor receiving a very accurate measurement of the average light intensity incident on the image plane.

Operation of Circuitry

Referring to FIG. 1, the lamps 30 and 31 are connected to a timing circuit 33 which includes a starting switch 34, which in the present embodiment is shown as a manual pushbutton switch. In order to initiate a copying cycle, the switch 34 is closed and then opened. The lamps 30 and 31 are energized. The light transducer 25 provides an output indicative of the intensity of light impinging thereon. The light transducer 25 is connected to an integrator 35. The integrator 35 provides an output to a comparator 37 which is indicative of the time integral of the intensity of light impinging on the light transducer 25. The comparator 37 has an output connected to the timing circuit 33 and is responsive to a predetermined threshold level. When the output of the integrator 35 reaches the predetermined level, the comparator 37 provides an output to the timing circuit 33 for disabling the lamps 30 and 31. At the same time, the timing circuit 33 provides an output coupled to reset the integrator 35 to an initial state prior to a next copying cycle.

It should be noted that different ways of disabling lamps 30 and 31 may be provided. In some embodiments, the lamps 31 and 33 are simply disconnected from their power source. In other forms of copying machines, it may be desirable to decrease the energization of the lamps 30 and 31 from a "full on" level to a "standby" level. The light provided by the lamps 30 and 31 in a "standby" mode is of a sufficiently low level such that photosensitive apparatus in the copy machine does not respond thereto.

Figure 2:
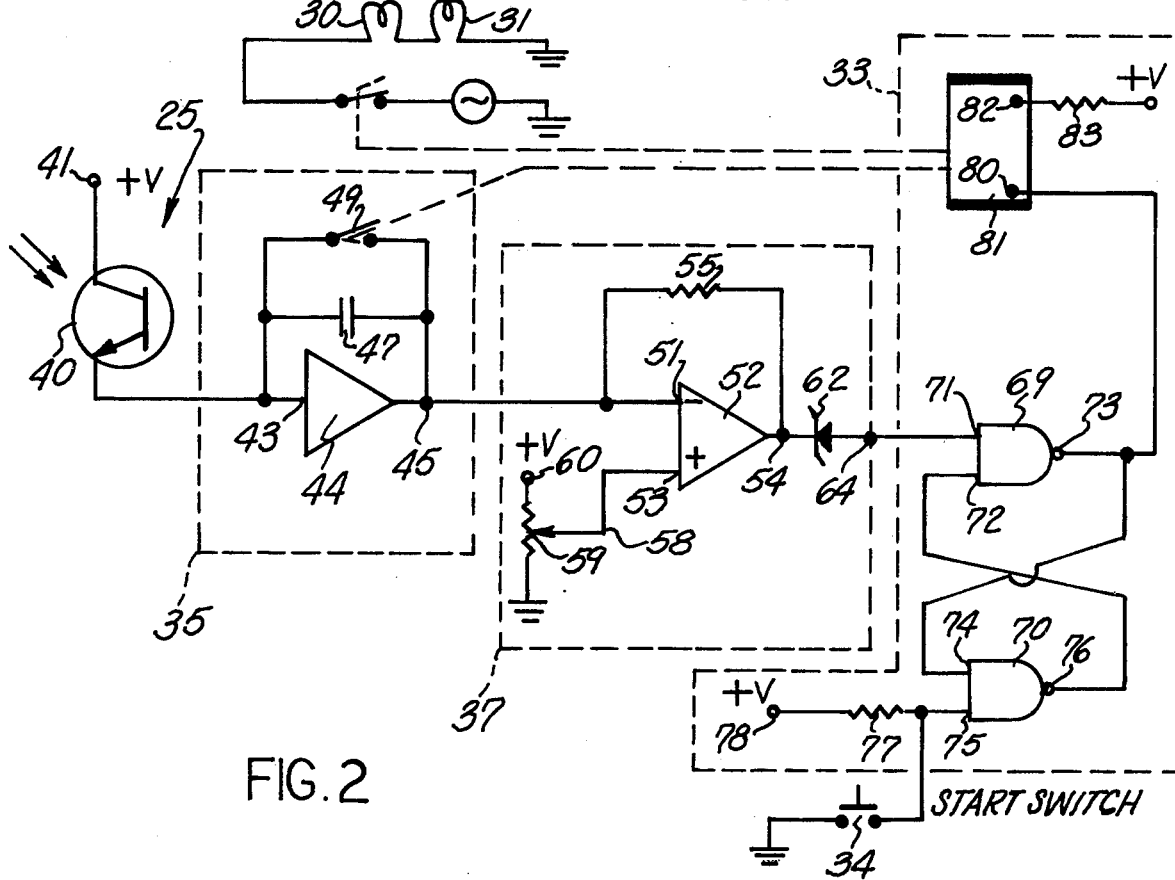
FIG. 2 is an electrical schematic showing control circuitry for controlling the time of illumination for an image projection in accordance with the present invention.

FIG. 2 is a schematic illustration of suitable circuitry which can be used to implement the system as illustrated in FIG. 1. In FIG. 2, the same reference numerals are used to denote components corresponding to those of FIG. 1. The term +V indicates a positive potential source in the circuit of FIG. 2. In the embodiment of FIG. 2, the light transducer 25 comprises a phototransistor 40 having its collector connected at a terminal 41 to the source +V and its emitter connected to an input terminal 43 of an operational amplifier 44 in the integrator 35. The operational amplifier 44 has an output terminal 45, which comprises the output terminal of the integrator 35. A capacitor 47 is connected across the terminals 43 and 45 so that the operational amplifier 44 performs the integrating function, and a relay-controlled switch 49 is connected across the capacitor 47 for control by the timing circuit 33 as described below. In other embodiments, a solid state switch 49 may be provided.

The integrated output at the terminal 45 is applied to an input terminal 51 of the comparator 37. The input terminal 51 is the inverting input of an operational amplifier 52 which also has a non-inverting input terminal 53 and an output terminal 54. A feedback resistor 55 is connected from the output terminal 54 to the inverting input terminal 51. In order to provide a reference potential against which to compare the integrated signal at the terminal 51, an arm 58 of a potentiometer 59 having a terminal 60 connected to the source +V is connected to the non-inverting input terminal 53. Consequently, as the time integral of light impinging on the phototransducer 25 increases, the potential level at the output terminal 54 decreases. The output terminal 54 of the operational amplifier 52 is connected to the cathode of a Zener diode 62 having an anode connected to an output terminal 64 of the comparator 37.

At the beginning of a copying cycle, when the output of the integrator 35 is low, the output of the comparator 37 is high and the Zener diode is broken down. When the output of the integrator 35 reaches a predetermined level, determined by the reference voltage applied at the terminal 53, the voltage at the terminal 54 decreases below the breakdown level of the Zener diode 62. Thus, in the present embodiment, the output of the comparator 37 which is indicative of the predetermined level of illumination is the transition of the potential at the output terminal 64 from a high level to a low level.

The timing circuit 33 includes first and second NAND gates 69 and 70 interconnected in the manner of a flip-flop circuit. More specifically, the NAND gate 69 has first and second input terminals 71 and 72 and an output terminal 73. The NAND gate 70 has first and second input terminals 74 and 75 and an output terminal 76. The input terminal 71 comprises the input terminal of the timing circuit 33 and is connected to the output terminal 64 of the comparator 37. The input terminal 72 is connected to the output terminal 76 of the NAND gate 70. The output terminal 73 is connected to the input terminal 74 of the NAND gate 70. The input terminal 75 has the start switch 34 connected thereto a resistor 77 is connected between the input terminal 75 and a terminal 78 connected to the source of potential +V. The output terminal 73 of the NAND gate 69 is also connected to a first terminal 80 of a relay 81 having a second input terminal 82 coupled by a resistor 83 to the source +V. The relay 80 controls the reset switch 49 described above and also controls a switch 85 connected in series between the lamps 30, 31 and a lamp power source 86.

In the present description, the terms high and low are utilized to describe the possible potential states at the terminals 71–76 and respectively correspond to a logic one and logic zero.

FIG. 3 is a diagram of the well-known "truth table" describing the operation of a NAND gate. The first two columns represent possible states at first and second input terminals expressed in terms of high and low, where high corresponds to a logic one and low corresponds to a logic zero. The third column represents the potential state at the output terminal of the NAND gate. Both NAND gates 69 and 70 operate in accordance with the table of FIG. 3.

When the output terminal 73 of the NAND gate 69 is at a high stage, the relay 81 is deenergized. In this case, since the terminal 81 thereof is at a high state and the terminal 82 is at a high state by virtue of being coupled to the source +V there is no voltage drop across the coil of the relay 81. When the relay 80 is deenergized, the switch 49 is closed and the switch 85 is open. When the potential at the output terminal 73 of the NAND gate is at a low state, there is voltage drop across the coil of the relay 81 so that the relay 81 is energized, which permits the integrator 35 to integrate, and closing the switch 85 so that the lamps 30, 31 are energized.

Operation of the circuit is described with respect to FIGS. 2 and 4. FIG. 4 is a timing chart illustrative of the states of the terminals of the NAND gates 69 and 70 during one copying cycle. Each column is labeled by the terminal whose potential level is specified. In each line, transitions of states are underlined to illustrate the operating sequence. The lines from the numbers 72 to 76 and from 73 to 74 indicate terminals directly connected to each other. Initially, before copying, there is no input to the light transducer 25. Consequently, as described above, the output of the terminal 64 of the comparator 37 is at its high state. Thus the terminal 71 of the NAND gate 69 is at its high state. Initially, the terminals 73–75 are at a high state and the terminals 72 and 76 are at a low state. In order to initiate operation, the starting switch 34 is temporarily closed. The terminal 75 which was at a high state due to its coupling to the source +V is effectively short-circuited to ground potential by the switch 34 and assumes a low state. Consequently, the terminal 76 assumes a high state which propagates to the terminal 72. With a high state at both the terminal 71 and the terminal 72, the terminal 73 assumes a low state and there is a voltage drop across the relay 81. Consequently, the switch 85 closes and the switch 49 opens. The lamps 30, 31 illuminate the object, and the integrator 35 begins to perform the integrating function.

Since the terminal 73 assumed a low state, the terminal 74 connected thereto assumes a low state. This is reflected in line 3 of FIG. 4. At this point, the start switch 34 is released, and the terminal 75 again assumes its high state. It should be noted that where the switch 34 is a conventional push-button switch, the normal manual operation will leave the terminal 75 at its low state for a sufficiently long time for the above-described states to propagate through the logic circuitry. If desired, however, conventional latching circuitry could be provided to guarantee a sufficiently long minimum period of closing of the switch 34.

Thus the terminals of the timing circuit 33 assume the states illustrated in line 4 of FIG. 4. The lamps 30, 31 continue to illuminate the light transducer 25 until the above-described predetermined level of output of the integrator 35 is reached. At this point, the Zener diode 62 of the comparator 37 ceases conducting, and the terminal 71 of the NAND gate 69 assumes a low state. Since there is a low state at the terminal 71 and a high state at the terminal 72, the terminal 73 switches to the high state. Consequently, the relay 81 is deenergized and the switch 85 opens thus disabling the lamps 30, 31, and the switch 49 closes to discharge the capacitor 47, thus resetting the integrator 35.

The various states propagate as follows to return the timing circuit 33 to its initial state. The high state at the terminal 73 propagates to the terminal 74, also illustrated in line 5 of FIG. 4, and causes the terminal 76 to assume a low state. This state propagates to the terminal 72 of the NAND gate 71. By this time, the capacitor 47 has discharged so that the input to the comparator 37 is below the predetermined level. The subtracting input is thus removed from the terminal 51 of the operational amplifier 52. Thus the potential level at the terminal 54 resumes its high state, breaking down the Zener diode 62 and, as seen in line 7 of FIG. 4, the terminal 71 returns to a high state. Line 7 is identical to line 1. In other words, the system has returned to its initial state and is enabled to perform a next copying cycle.

The foregoing description relates to exposure control for a projection system in which an illuminated image is projected from an object plane to an image plane. It will be clearly obvious to those of ordinary skill in the copying art that as applied to a photocopier apparatus, the image plane may not be parallel to the object plane, as shown in FIG. 1, but may also extend at various inclinations relative to the object plane, depending upon the compactness of the copier, the particular lensing system used, or various other considerations. However, it will be equally recognizable that the principals of the present invention are applicable to such various forms of systems. In addition, while the details of the present invention have been fully disclosed in terms of the exposure control system it is contemplated that the remainder of the photocopying apparatus used to describe the preferred embodiment would employ conventional apparatus which need not be disclosed in any further detail.

Thus, having described the preferred embodiment of the present invention, many and varied obvious modifications of this invention will become readily apparent to those of ordinary skill in the art.

Therefore, what is claimed is:

1. Apparatus comprising means for projecting an image from an illuminated object plane to an image plane comprising illumination means for illuminating the object plane, a lens for receiving illumination reflected from said object plane and for transmitting said reflected illumination therethrough and onto said image plane, the path of said reflected illumination from said object plane to said image plane forming a light path, the portion of the light path between the lens and the object plane defining the object side of the lens and the portion of the light path between the lens and the image plane defining the image side of the lens, transducer means in said light path and on the image side of said lens for sensing the intensity of light traversing said light path and for producing an output signal whose intensity varies in accordance therewith, said transducer means being spaced from said lens a distance which is no more than 10% of the distance from the lens to the image plane and means coupled to said transducer means for controlling the illumination of said object plane by said illumination means in accordance with the intensity of said output signal.

2. In a photocopier of the full frame exposure type wherein an entire object plane in which a document is located is illuminated by an illumination means, and the reflected illumination is received by a lens and transmitted therethrough and onto an image plane, the path of the reflected illumination from the object plane to the image plane forming a light path, the improvement comprising transducer means in said light path and on the image side of said lens for sensing the intensity of light traversing said light path and for producing an output signal whose intensity varies in accordance therewith, said transducer means being spaced from said lens a distance which is no more than 10% of the distance from the lens to the image plane, and means coupled to said transducer means for controlling the illumination of said object plane by said illumination means in accordance with the intensity of said output signal.

3. In a photocopier of the full frame exposure type wherein an entire object plane in which a document is located is illuminated by an illumination means, and the reflected illumination is received by a lens and transmitted therethrough and onto an image plane, the path of the reflected illumination from the object plane to the image plane forming a light path, the improvement comprising transducer means in said light path and on the image side of said lens for sensing the intensity of light traversing said light path and for producing an output signal whose intensity varies in accordance therewith, said transducer means being spaced from said lens a distance which is no more than 10% of the distance from the lens to the image plane, means coupled to said transducer means for producing an output signal corresponding to the time integral of the intensity of illumination sensed by said transducer means, and means for discontinuing the illumination of said object plane by said illumination means when said output signal reaches a predetermined level.

4. Apparatus as set forth in claim 3 in which the means coupled to said transducer means comprises an integrating circuit producing an output voltage, and in which the means for discontinuing the illumination comprises a comparator means connected with the output of said integrating circuit and including a source of reference voltage, and means connected with said comparator means for terminating illumination by the illumination means when the output voltage of the integrating circuit reaches a predetermined relationship to the reference voltage.

* * * * *